United States Patent [19]

Cook

[11] 4,260,198
[45] Apr. 7, 1981

[54] SKID CONTROL VALVE AND SYSTEM

[75] Inventor: Robert D. Cook, Valencia, Calif.

[73] Assignee: Crane Co., New York, N.Y.

[21] Appl. No.: 23,611

[22] Filed: Mar. 26, 1979

[51] Int. Cl.³ .......................................... B60T 17/18
[52] U.S. Cl. .................................... 303/92; 303/117; 303/119
[58] Field of Search ............... 303/117, 116, 118, 119, 303/92, 93, 63, 113; 188/181 C, 181 R; 60/582, 403; 137/625.63, 625.64, 625.62; 91/28, 6, 461

[56] References Cited

U.S. PATENT DOCUMENTS

| | | | |
|---|---|---|---|
| 3,923,423 | 12/1975 | Lauck | 60/403 |
| 4,053,187 | 10/1977 | Cook | 303/117 |

Primary Examiner—Trygve M. Blix
Assistant Examiner—Reinhard Eisenzopf
Attorney, Agent, or Firm—Hume, Clement, Brinks, Willian & Olds, Ltd.

[57] ABSTRACT

A vehicle skid control system including a wheel speed transducer, skid control circuitry responsive to the transducer for generating a control current output and a skid control valve responsive to the control current for providing single-gain control in a skid control mode under normal operating conditions. The skid control valve includes a first stage for generating a control pressure from a source of substantially constant fluid pressure which is normally controlled exclusively by the current output of the valve driver, which control pressure is representative of the threshhold pressure which an input metered pressure should not exceed if a skid condition is to be avoided. The control valve further includes a second stage pressure balancing system responsive to allow a metered supply pressure to be applied to a brake port as long as the metered pressure does not exceed the first stage control pressure. Under normal operating conditions, when the metered pressure exceeds the control pressure the second stage becomes operative to modulate the brake port pressure in accordance with the control pressure completely independently of variations in the metered pressure, as long as the metered pressure remains above the control pressure from the first stage, thereby providing the single gain characteristic in the skid control mode. In a hydraulic failure condition, when the source of substantially constant fluid pressure in the first stage fails, means in the valve connect said first stage to said metered pressure. The valve thereby prevents the pressure in the brake port from dropping to zero as a result of such failure by substituting the metered pressure for the substantially constant pressure.

8 Claims, 2 Drawing Figures

SKID CONTROL VALVE AND SYSTEM

BACKGROUND AND SUMMARY OF THE INVENTION

The present invention relates generally to a vehicle skid control system, and more particularly relates to a skid control system embodying protection against a hydraulic failure.

U.S. Pat. No. 4,130,322, for a SINGLE GAIN SKID CONTROL VALVE AND SKID CONTROL SYSTEM, owned by the same Assignee as the present application, discloses and claims a skid control system for controlling the brake pressure when the input metered pressure is in excess of a predetermined control pressure. The control pressure for such a valve is generated in response to a control signal generated by the skid control circuitry of the system.

More specifically, said patent discloses a system including a two-stage control valve wherein the first stage is a hydraulic amplifier for producing a control pressure in response to an input control current. The second stage of the valve is a pressure follower stage for controlling the hydraulic pressure applied to at least one brake port in response to the pressure difference between the control pressure and a metered supply pressure. The supply pressure for the first stage is obtained from a substantially constant pressure source of hydraulic power and is independent of the metered supply pressure variations. The substantially constant pressure source for said valve therefore allows the control pressure to be independent of the metered supply pressure variations under normal skid control operating conditions.

The present invention relates to an improvement in the skid control valve and system disclosed and claimed in said U.S. Pat. No. 4,130,322 to protect the braking and skid control system against hydraulic failure. More specifically, the present invention protects the valve and system against a failure mode wherein the hydraulic pressure from the above-described constant pressure source is substantially reduced or eliminated. In accordance with this invention, the metered supply pressure source is connected in fluid communication with the first stage of the control valve and with the constant pressure source through a series of hydraulic check valves. The check valves and the system are arranged so that the predetermined control pressure generated by the constant pressure source determines the skid-control characteristics of the system, and the valve functions as a single-gain control valve, during normal skid control operating conditions. During such normal operations the check valves isolate the metered pressure source from the constant pressure source and the first stage of the valve, so that the supply pressure of the first stage is independent of the metered supply pressure variations.

Different operating characteristics prevail in the skid control system and valve in the event of a failure in the constant pressure control source. In such a failure mode, the check valves and system function to isolate the failed constant pressure source from the first stage of the valve, and to simultaneously connect the valve first stage with the metered pressure source. By such an arrangement, the valve will function as a multi-gain control valve during the failure mode, and will prevent the applied brake pressure from being reduced drastically, or from going to zero, when metering pressure is applied to the control valve despite failure of the source of constant hydraulic pressure.

The illustrated embodiment of the control valve and system in accordance with this invention includes a two-stage valve for controlling a single vehicle wheel. It will be appreciated that this invention is readily adaptable to other arrangements such as for dual control valves for the differential braking of a pair of wheels.

BRIEF DESCRIPTION OF THE DRAWINGS

The foregoing and other objects, features and advantages of the present invention will be readily apparent to one skilled in the art from the following detailed description when read in conjunction with the drawing wherein.

DETAILED DESCRIPTION OF THE DISCLOSURE

Figure 1:
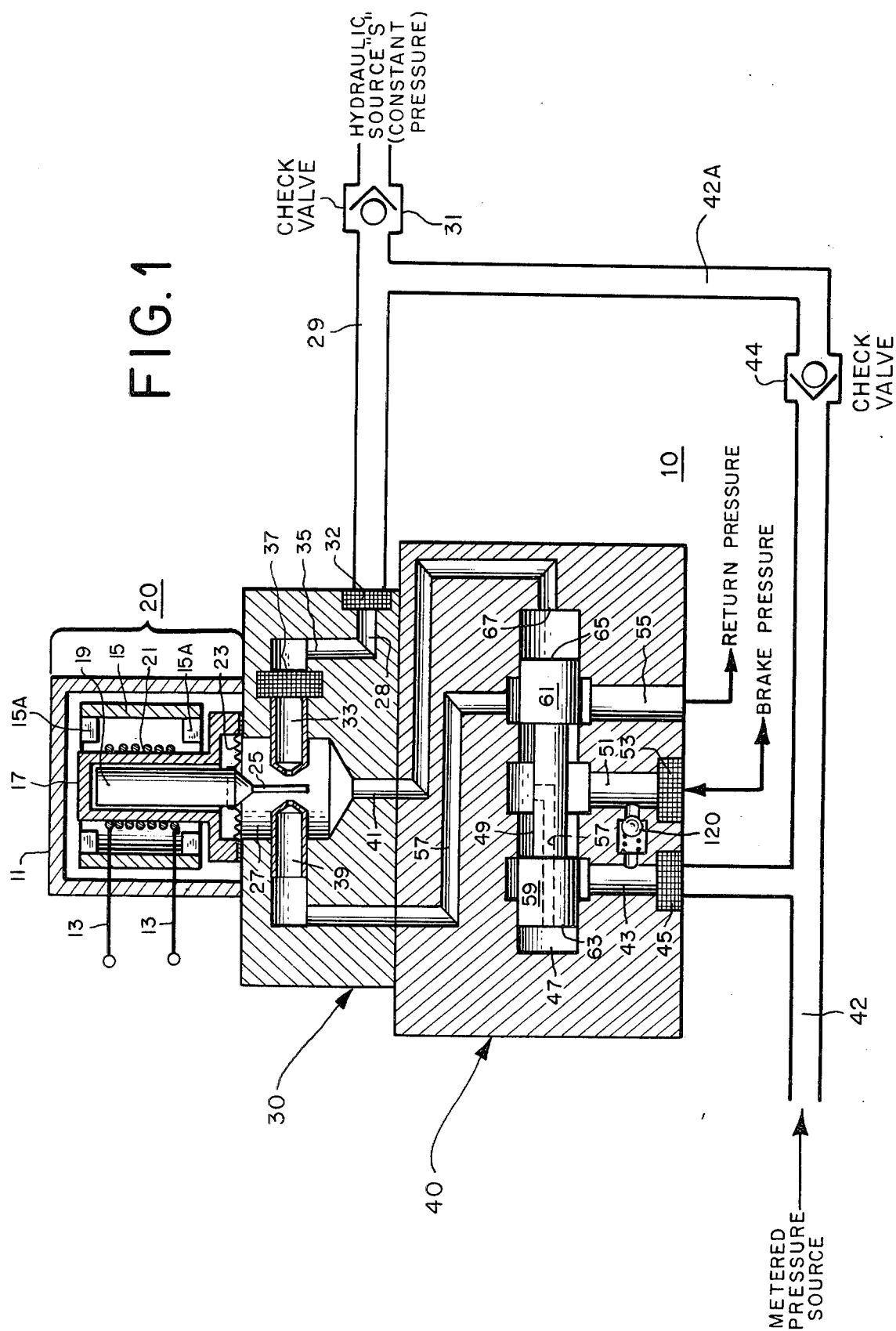
FIG. 1 is a cross-section view of a single wheel control valve of the present invention.

As noted above, FIG. 1 discloses a skid control valve 10 for use in control a single wheel of a vehicle. The single wheel control valve 10 includes a permanent magnet torque motor indicated by the reference numeral 20 which can be generally described as a motor for converting an electrical input signal to a mechanical position which is a function of the input electrical signal level. The torque motor 20 includes a motor cover 11 for protecting the internal elements of the motor 20 and input terminals 13 for accepting an electrical control current. A cylindrical-shaped magnet 15 having a pair of opposing, inwardly extending pole sections 15A are provided for producing a constant flux. The pole sections 15A are located on the cylinder ends of the magnet 15 in radially opposite positions and extend only through small arc portions of the cylinder ends. A fluid barrier 17 surrounds an armature 19 which is exposed to hydraulic fluid while the other elements on the other side of the fluid barrier 17 are isolated from the hydraulic fluid. The fluid barrier 17 is dimensioned to allow sufficent movement of the armature 19. A coil 21 is wound around the fluid barrier 17 and is connected to the input leads 13 for producing a variable flux in the air gaps between the pole sections 15A. The armature 19 is pivotally suspended by a spring suspension 23 for pivotal displacement in response to the variation in flux caused by the input current applied to the input terminals 13. The armature 19 terminates in a flapper 25, the position of which is a function of the input current applied to input terminals 13.

The skid control valve 10 includes a first stage designated with the reference numeral 30 for generating a control pressure and includes a control chamber 27 into which the flapper 25 extends. A supply pressure port 28 is provided for accepting substantially constant pressure from a constant pressure source external to the skid control valve 10. A supply conduit 29 including a check valve 31 joins the port 28 in fluid communication with the constant pressure source 'S'. A port filter 32 is provided for preventing the entry of contaminants into the internal structure of the skid control valve 10. A supply nozzle 33 is in communication with the supply port 28 via a supply channel 35. The supply nozzle 33 has its tip opening adjacent one side of the flapper 25 and the flapper 25 is appropriately positioned to close off the tip of the supply nozzle 33 when completely displaced toward the nozzle 33. On the other side of flapper 25 and opposite the supply nozzle 33 is a return nozzle 39 for returning the hydraulic fluid brought into the control chamber 27 through the supply pressure nozzle 33. The return nozzle is also positioned to be closed off by the flapper 25 when the flapper is completely displaced toward the return nozzle 39. Both nozzles 33 and 39 cooperate with the flapper 25 for controlling the hydraulic pressure within the control chamber 27 in response to input control current signals applied to the input terminals 13. As the input control current level is varied, the armature 19 is pivotally displaced about the spring suspension 23 and therefore varies the position of the flapper 25 with respect to the nozzles 33 and 39. This changes the flow rate through the control chamber 27 and thereby changes the pressure within the control chamber. For example, as the flapper 25 is displaced towards the return nozzle 39 return flow through the return nozzle 39 is reduced and therefore the hydraulic flow through the control chamber 27 is reduced. This results in an increase of pressure within the control chamber 27. Completely closing off the return nozzle 39 results in a control pressure in the control chamber which is equal to the supply pressure applied at the supply port 28. Maintaining the flapper 25 in a fixed position by applying a fixed current input also fixes the pressure within the control chamber 27.

From the foregoing it is readily seen that the torque motor 20 cooperates with the first stage 30 of the control valve 10 to generate a control pressure within the control chamber 27 which is a function of the input control current applied to the input terminals 13. The control pressure generated within the control chamber 27 is applied to a second stage 40 of the control valve 10 via a control pressure channel 41.

The second stage 40 includes a metered pressure input port 43 through which variable metered pressure is applied to the control valve 10 through a suitable fluid input conduit 42. In the usual situation this metered pressure is varied by the operator of the brake system, such as an airplane pilot. A filter 45 is provided at the external opening of the metered pressure port 43. As seen clearly in FIG. 1, the metered pressure input conduit 42 includes an extension 42A which is in fluid communication with the constant pressure source conduit 29 through a check valve 44. As explained further below, the check valves 31 and 44 are arranged so that under normal operations, with a constant supply pressure applied in the conduit 29 and to the port 28, valve 31 is opened and valve 44 is closed. Thus, under normal conditions, the first stage 30 of the valve 10, and the pressure port 28, are isolated from the pressure variations of the metered pressure source in the metered pressure input conduit 42.

The metered pressure port 43 is in communication with a valve chamber 47 in which a spool valve 49 is slidably fitted. A brake pressure port 51, which has a filter 53 at its external opening, is also in communication with the valve chamber 47 and is externally connected to the hydraulic braking system of a wheel. A check valve 120 connects the brake pressure port 51 with the metered pressure port 43 in a manner so that the valve 120 is closed when the pressure in the metered port 43 is equal to or greater than the pressure in the brake port 51. A return port 55 is provided for the return nozzle 39 of the first stage 30, which return nozzle is also in communication with the valve chamber 47 via a return channel 57. The spool valve 49 includes a metering spool 59 at one end and a return spool 61 at the other end. The intermediate portion of the spool valve 49 is narrower than the spools 59 and 61 and the dimensions of the spool valve 49 are chosen in such a manner that there is only one equilibrium position, as shown in FIG. 1, wherein both the metered pressure port 43 and return port 55 are shut off by metering spool 59 and the return spool 61, respectively. The portion of the valve chamber 47 in the vicinity of the brake port 51 includes an annular extension of the valve chamber 47 for maximizing the flow between the metered pressure port 43 and the brake port 51. The spool valve 49 includes a pressure equalizing channel 57 for maintaining the pressure in that portion of the valve chamber 47 on the open side of the metering spool 59 at the same pressure as the pressure at the brake port 51. This causes the brake port pressure to be applied to a brake pressure surface 63. An annular extension is also provided in that portion of the valve chamber which is in the vicinity of the return port 55 to insure that the return port is always open to return pressure present in the return channel 57 which is in communication with the return nozzle 39. The control pressure generated in the control chamber 27 is applied to a control surface 65 on the free end the spool 61 through a control pressure input port 67 which is connected to the control pressure channel 41.

The operation of the single wheel skid control valve in the non-failure mode, under conditions where the pressure in the constant pressure source connected to conduit 29 is maintained, is as follows. The permanent magnet 15 and the coil 21 of the torque motor 20 are preferably structured in such a manner that with no control current input being applied to the input terminals 13, the flapper 25 is positioned against the tip of the return nozzle 39 and thereby closes off a return path for the hydraulic fluid within the control chamber 27. This causes the control pressure within the control chamber 27 to be equal to the supply pressure being applied at the supply port 28. Therefore, with no control current input, the pressure being applied to the control pressure surface 65 is equal to the constant supply pressure being applied to supply port 28. The spool valve 49 will therefore remain in its leftmost position and the skid control valve 10 will operate in a metered pressure mode wherein brake port pressure in port 51 will be equal to the metered pressure in port 43.

With this particular relationship between input current and control pressure, a control pressure lower than supply pressure will be generated in the control chamber 27 only when an input is applied to the input terminals 13. When an input control current is applied to the input terminals 13, a control pressure less than the constant supply pressure will be generated in the control chamber 27 because the flapper 25 will be caused to move toward the supply nozzle 33. When a control pressure less than the supply pressure is generated, the brake port 51 will be open to the metered pressure being applied to the metered pressure port 43 as long as the metered pressure against surface 63 does not exceed the control pressure against the surface 65. However, if the metered pressure equals or exceeds the control pressure and causes the brake port pressure to equal or exceed the control pressure, the spool valve 49 will act as a pressure follower for maintaining the brake port pressure at approximately the same pressure as the control pressure. When the spool valve acts as a pressure follower, the skid control valve 10 is operating in a skid control mode in which the pressure in the brake port 51 is controlled by the control pressure independently of the metered pressure as long as the metered pressure exceeds the control pressure. Whenever the metered pressure in port 43 drops below the brake pressure in port 51, the check valve 120 opens to reduce brake port pressure to the level of the metered pressure. The spool valve 49 then moves to the left in FIG. 1, and reconnects the metered pressure port 43 with the brake port 51. The brake pressure will then equal the metered pressure until the metered pressure exceeds the control pressure. The spool 49 then functions as a pressure follower once again.

The pressure follower function of the second stage 40 occurs because the spool valve 49 is displaced within the valve chamber 47 as a function of the pressure applied to the brake pressure surface 63 and the control pressure surface 65. The metered pressure mode, wherein the brake pressure is controlled by metered pressure, is maintained whenever the brake port 51 pressure is maintained at a level which is less than the pressure from the control chamber 27 which is being applied to the control pressure surface 65. During such a metered pressure mode of operation, the spool valve 49 is positioned to the left, thereby maintaining the brake port 51 open to the pressure that is present in the metered pressure port 43. As long as the metered pressure applied to the metered pressure port 43, which controls the pressure in the brake pressure port 51, is maintained at a level less than the control pressure being applied to the control pressure surface 65, the spool valve 49 will maintain its leftmost position and thereby allow the metered pressure to control the brake port pressure.

The skid control mode of operation of the skid control valve 10 is initiated whenever the metered pressure exceeds the control pressure. This may be brought about by an input metered pressure applied to the metered pressure port 43 which is greater than the control pressure or by a decrease in the control pressure in response to a change in the control current applied to the input terminals 13. Because of the greater pressure being applied to the brake pressure surface 63, the spool valve 49 will move to the right and thereby shut off the metered pressure port 43 because of the location of the metering spool 59. The spool valve 49 will move further to the right and thereby open the return port 55 for the release of brake port pressure while maintaining the metered pressure port 43 closed. The return port 55 is maintained open with respect to the valve chamber 47 for as long as the brake port pressure is in excess of the control pressure being applied to the control pressure surface 65. When the brake port pressure and the control pressure are approximately equal, the spool valve will attain an equilibrium position in which both the metered port 43 and the return pressure port 55 are shut off by the spools 59 and 61, respectively, such as illustrated in FIG. 1.

From the foregoing it can be seen that as long as the brake port pressure is equal to or greater than the control pressure, and the control pressure is maintained, the spool valve 49 will function so as to maintain the brake port pressure approximately equal to the control pressure. When the control pressure applied to the control pressure surface 65 is caused to increase above the brake port pressure, the spool valve will be displaced to the left and thereby open the metered pressure port 43 to the brake port 51. The equilibrium position of the spool valve 49, as shown in FIG. 1, will also be achieved when the input metered pressure applied to the metered pressure port 43 causes the brake port pressure to equal a control chamber pressure being applied to the control pressure surface 65. The reason for this is that the brake pressure surface 63 is responsive to the feedback pressure which is fed back to the valve chamber 47 when the brake port is pressurized to the pressure present in the metered pressure port 43.

As described in the above-noted U.S. Pat. No. 4,130,322, the above-described structure including the torque motor 20 and the first stage hydraulic amplifier for generating a control pressure which decreases as current increases is a system well suited for skid control because a skid control circuit will generally be designed to have a zero or low output when no incipient skid conditions are sensed. Therefore, when no skid condition is sensed, and under normal conditions when the constant pressure source 'S' is maintained, the control pressure in the skid control valve 10 is equal to the constant supply pressure. When skid conditions are sensed, a current signal will be applied to the input terminals of the control valve 10 which causes the control pressure to decrease and thereby control the maximum allowable brake pressure. Removal of the control current in response to non-skid conditions returns the control pressure to supply pressure; and the control valve 10 thereby insures that during non-skid conditions the brake port 51 is always open to the metered pressure applied to the metered pressure port 43.

In accordance with this invention, the valve 10 is provided with a system which protects against failure in the constant hydraulic pressure source which supplies pressure to port 28. This system includes the conduits 29, 42 and 42A, and the check valves 31 and 44. Under normal operations, with or without skidding, the constant pressure from source 'S' biases the check valve 31 open, and biases the check valve 44 closed. Port 28 is thereby directly connected to the constant pressure source through check valve 31, and is isolated from the metered pressure in the input conduit 42 by the check valve 44. In this configuration, the valve 10 operates, in the skid and non-skid modes, as a single gain valve, as described above.

In the event of the failure of the source of constant hydraulic pressure, the valve 10 in accordance with this invention will function to control braking by substituting the variable metered pressure source for the constant pressure source 'S'. As seen in FIG. 1, the drastic reduction or the elimination of this constant pressure source 'S' causes the over-riding pressure from the metered pressure source to open the check valve 44 and close the check valve 31. The closing of check valve 31 isolates the valve 10 from the failed hydraulic source. The opening of check valve 44 connects the port 28 and the first stage 30 of the valve 10 directly to the metered pressure source. The above-described operation of the valve 10, in both the skid and non-skid conditions, is thereby modified to substitute the application of the variable metered pressure for the constant supply pressure in control chamber 27 and against the valve spool control surface 65. In this failure mode of operation, the spool valve 49 acts as a pressure follower for maintaining the pressure in the brake port 51 at approximately the same pressure as variable metered pressure applied through the conduit 42, 42A and 29 during non-skid conditions. The check valves 44 and 31 also prevent the brake pressure in the brake port 51 from dropping to zero if the constant hydraulic source 'S' fails during a skid mode, where the port 51 is connected to the return port 55 by the rightward position of the valve 49.

In the failure mode, the metered pressure controls the brake pressure during non-skid conditions, as described above. If a skid condition exists during the failure mode, the valve 10 operates as described above to control the skid, except that the variable metered pressure is substituted at port 28 for the failed constant pressure. The skid will trigger an input control current at the input terminals 13 of the torque motor 20, and the first stage 30 of the valve will respond by correspondingly reducing the metered pressure in the chamber 27 and against the spool valve control surface 65. The metered pressure port 43 is thereby closed, and the brake pressure is controlled by this new control pressure established by the metered pressure at port 28 reduced by the function of the first stage 30 of the valve. The brake pressure in port 51 will return to metered pressure or approximately metered pressure when the skid condition ceases to exist.

Figure 2:
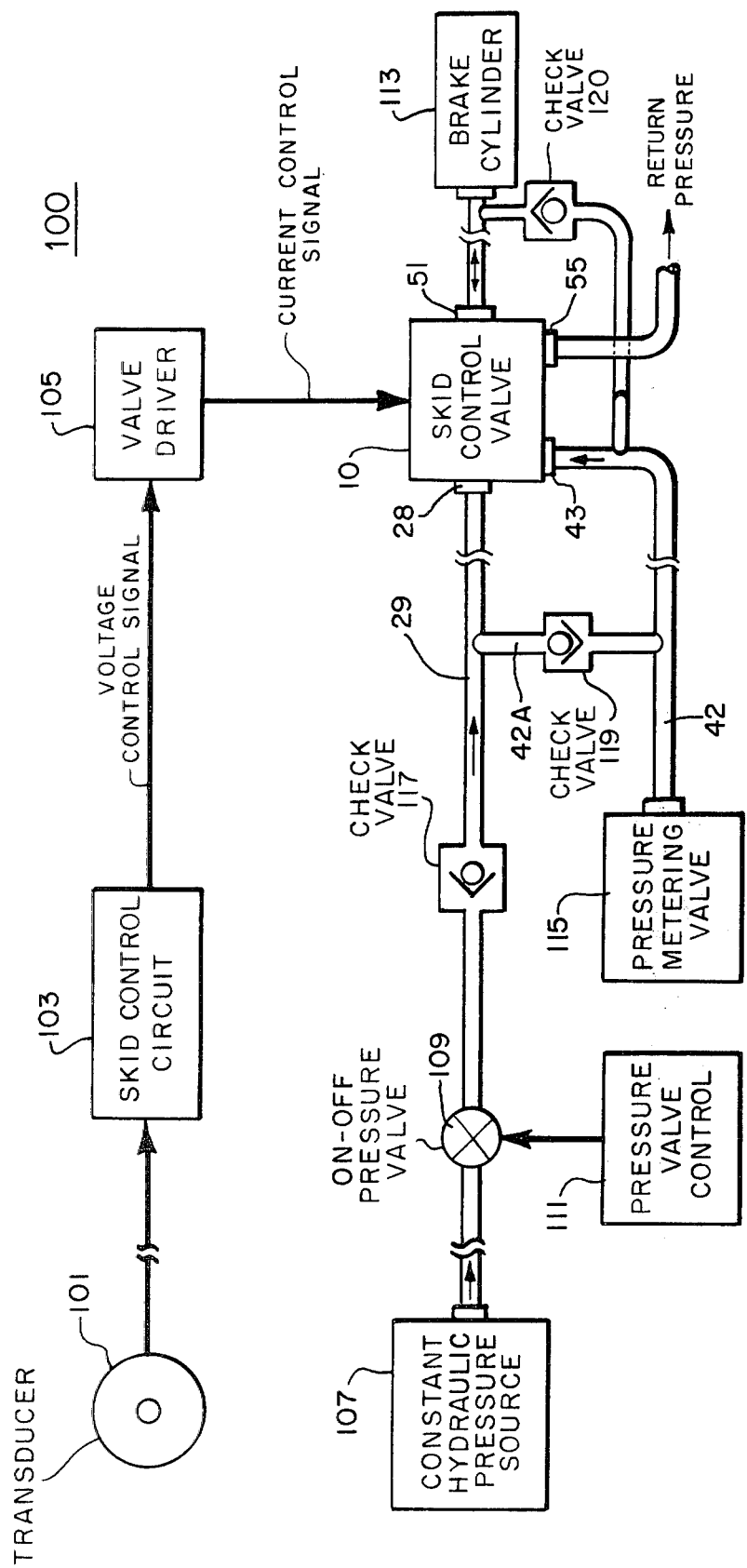
FIG. 2 is a system diagram of the major components of a skid-control system embodying the skid control system and hydraulic failure protection of the present invention.

The skid control valves are for use in a skid control system 100 as shown in FIG. 2. The skid control system 100 illustrates the use of the single wheel skid control valve 10 shown in FIG. 1 and described above.

The skid control system 100 includes a wheel speed transducer 101 which senses wheel speed and generates an electrical signal representative of wheel speed for application to a skid control circuit 103. This skid control circuit 103 performs various operations on the wheel speed signal and generates a control signal, the level of which will generally represent a threshold skid pressure. An example of such a skid control circuit 103 is disclosed in U.S. Pat. No. 3,768,873 issued on Oct. 30, 1973. A valve driver 105 accepts the voltage control signal from the skid control circuit 103 and generates a current control signal which is a function of the input voltage control signal and is therefore also representative of a threshold skid pressure. The current type valve drive 105 is utilized because the skid control valve 10 is a current controlled servovalve.

The hydraulic elements of the skid control system 100 include the skid control valve 10 disclosed in FIG. 1, which is adapted to accept substantially constant hydraulic pressure from source 107. Interposed between the supply port 28 and the constant pressure source 107 is an on-off pressure valve 109 for selectively allowing or preventing the application of hydraulic pressure from valve control 111. Such selective application of pressure to the skid control valve 10 is desirable to avoid unnecessary supply pressure application under conditions when braking is not necessary. This relief of pressure prevents undesirable leakage within the valve. For example, in a skid control system for an airplane, the on-off pressure valve 109 can be used to prevent the application of supply pressure to the skid control valve 10 whenever the landing gear is in the up position. Of course, it would also be possible to regulate the application of pressure by turning the constant pressure source 107 on or off.

Also interposed between the constant pressure source 107 and the supply port 28 is the check valve 117 which isolates the valve 10 from the source 107 in the event of an hydraulic failure. In such an event, the conduit 42, 42A and check valve 119 connects the supply port 28 to the pressure metering valve 115, as described above.

As discussed above in conjunction with FIG. 1, the skid control valve 10 provides for the application of brake pressure to a brake cylinder 113 from the brake port 51. The brake port pressure is controlled by the skid control valve 10 to follow either the metered pressure applied to the metered pressure port 43 from a pressure metering valve 115 or the control pressure generated by the skid control valve 10 in response to the current control signal. The one-way check valve 120 opens the brake port 51 to the metered pressure port 43 whenever the brake port pressure exceeds the metered pressure. Although not shown, the pressure metering valve 115 can obtain its supply pressure from the constant pressure source 107. The return port 55 is appropriately connected to a hydraulic apparatus for relieving pressure which may also be connected to the pressure supply source 107 for recirculation of hydraulic fluid.

Although the foregoing has been a description of specific embodiments of the invention it will be apparent to one skilled in the art that various changes and modifications can be made without departing from the scope and spirit of the invention as defined by the following claims:

What is claimed is:

1. A vehicle braking control system comprising:
    a braking control circuit including a valve driver for providing an electrical skid control braking signal;
    means for providing a supply of hydraulic fluid at substantially constant pressure;
    means for providing hydraulic fluid at variable metered pressure;
    control means having an inlet for accepting said constant pressure hydraulic fluid in a normal mode of operation and for providing a hydraulic control output in response to said braking control circuit, said hydraulic control output being exclusively controlled by said electrical braking signal during said normal mode;
    brake pressure valving means selectively responsive to said metered pressure and said hydraulic control output for producing a brake pressure output which is limited by said hydraulic control output; and
    hydraulic failure mode adjustment means for connecting said variable metered pressure to said inlet of said control means in the event of failure of said supply of hydraulic fluid at substantially constant pressure so that said hydraulic control output is a function of said electrical braking signal and said metered pressure during said failure mode.

2. The vehicle braking control system in accordance with claim 1 wherein said brake pressure valving means includes a pressure balancing spool valve for controlling said brake pressure output in said normal and failure modes as a function of said metered pressure in the absence of a predetermined skid control signal from said braking control circuit and as a function of said hydraulic control output in the presence of said predetermined skid control signal.

3. The vehicle braking control system in accordance with claim 1 wherein said failure mode adjustment means includes valve means connecting said constant pressure supply to said control means inlet in said normal mode and connecting said variable metered pressure to said inlet and closing said inlet to said constant pressure supply in said failure mode.

4. The vehicle braking control system in accordance with claim 3 wherein said valve means includes a first check valve connecting said constant pressure source to said control means inlet in the normal mode and blocking fluid flow from said control means to said constant pressure source in said failure mode, and a second check valve blocking said metered pressure from said control means inlet in the normal mode and connecting said metered pressure to said inlet in the failure mode.

5. A method of controlling brake pressure for a wheel and responding to a hydraulic failure comprising the steps of:
   generating a variable braking control signal from wheel skid information;
   providing a supply of substantially constant pressure hydraulic fluid;
   providing a supply of hydraulic fluid at variable metered pressure;
   generating a hydraulic control output which in a normal mode of operation is a function of said variable braking control signal and said substantially constant pressure and which in a failure mode is a function of said variable braking control signal and said variable metered pressure when said supply of constant pressure fails; and
   generating a brake pressure as a function of said hydraulic control output and said variable metered pressure.

6. The method of claim 5 wherein the step of generating a hydraulic control output in the normal mode of operation includes the step of modulating said substantially constant hydraulic pressure as a function of said brake control signal and in the failure mode of operation includes the step of modulating said variable metered pressure as a function of said brake control signal.

7. The method of claim 6 wherein the step of generating a hydraulic control output further includes the step of isolating said hydraulic control output from said failed constant pressure supply during said failure mode of operation.

8. A vehicle braking control system comprising:
   a braking control circuit including a valve driver for providing an electrical skid control braking signal;
   means for providing a supply of hydraulic fluid at substantially constant pressure;
   means for providing hydraulic fluid at variable metered pressure;
   control means having an inlet for accepting said constant pressure hydraulic fluid in a normal mode of operation and for providing a hydraulic control output in response to said braking control circuit, said hydraulic control output being exclusively controlled by said electrical braking signal during said normal mode;
   brake pressure valving means selectively responsive to said metered pressure and said hydraulic control output for producing a brake pressure output which is limited by said hydraulic control output;
   hydraulic failure mode adjustment means for connecting said variable metered pressure to said inlet of said control means in the event of failure of said supply of hydraulic fluid at substantially constant pressure so that said hydraulic control output is a function of said electrical braking signal and metered pressure during said failure mode;
   said adjustment means including a first check valve connecting said constant pressure source to said control means inlet in the normal mode and blocking fluid flow from said control means to said constant pressure source in said failure mode, and a second check valve blocking said metered pressure from said control means inlet in the normal mode and connecting said metered pressure to said inlet in the failure mode; and
   said brake pressure valving means further including a pressure balancing spool valve for controlling said brake pressure output in said normal and failure modes as a function of said metered pressure in the absence of a predetermined skid control signal from said braking control circuit and as a function of said hydraulic control output in the presence of said predetermined skid control signal.

* * * * *